June 26, 1962     J. T. WARKOCZEWSKI     3,040,395
MOLD CORE LOADING DEVICE IMPROVEMENT
Filed March 18, 1960

INVENTOR.
Joseph T. Warkoczewski
BY
ATTORNEY.

United States Patent Office 3,040,395
Patented June 26, 1962

3,040,395
MOLD CORE LOADING DEVICE IMPROVEMENT
Joseph T. Warkoczewski, Kansas City, Mo., assignor to Gustin-Bacon Manufacturing Company, a corporation of Missouri
Filed Mar. 18, 1960, Ser. No. 15,953
5 Claims. (Cl. 22—37)

This invention relates to methods of and apparatus for loading mold cores into testing molds and refers more particularly to a vacuum loading device adapted to speed up and improve the loading of relatively delicate, frangible, mold cores into a centrifugal casting mold for casting finely perforated rings.

This application is a continuation-in-part of my application Serial No. 780,384, filed December 15, 1958, entitled "Mold Core Loading Device."

My application Serial No. 721,491, filed March 14, 1958, entitled "Method of and Apparatus for Forming Finely Perforated Rings," discloses casting apparatus and methods for providing finely perforated rings of extremely hard metal. This method and apparatus includes the use of centrifugal molds wherein large numbers (in the order of 2500) delicate frangible clay-graphite or other like substance small diameter cores extend into the centrifugal mold cavity.

As set forth in Serial No. 721,491, supra, such mold cores must presently be inserted, one by one, by hand, into the openings through the mold flange wall. Conventionally, this has taken about 6 or 7 hours. Inserting the mold cores in the flange ring to exactly the right depth is extremely difficult. Additionally, it is desired to insert the cores initially only a limited distance into the mold flange openings so that a later inspection can determine whether or not all of the cores have been inserted. This latter procedure makes the uniform insertion problem doubly difficult to the operator.

Therefore, an object of the present invention is to provide a vacuum-operated mold core loading device which will greatly speed the hand loading of casting molds, particularly centrifugal casting molds employed to cast finely perforated metal rings. The improvement in speed of loading is of a factor of three-to-one to five-to-one, thereby reducing the conventional time of inserting the cores from seven or thereabout hours to one and one-half to two hours.

Another object of the invention is to provide a vacuum-operated mold core loading device which precisely and exactly positions the mold core at a described depth of extension into the mold, either the final depth desired or a lesser depth whereby to permit inspection of the mold before casting.

Still another object of the invention is to provide a vacuum-operated mold core loading device which may be employed with a relatively low vacuum pulled thereon to successfully and speedily load mold cores into molds.

Another object of the invention is to provide a vacuum-operated mold core loading device which greatly speeds the core loading process, is cheap and easy to manufacture, convenient to use, simple, has an indefinitely long life under constant and hard usage, and wherein all the parts thereof are readily accessible for replacement and/or repair.

Another object of the invention is to provide a vacuum-operated mold core loading device which permits the insertion of the mold cores into the mold from the interior of the cavity, rather than from the exterior as in my previous application Serial No. 780,384.

Other and further objects will appear in the course of the following description thereof:

In the drawings, which form a part of the instant specification and are to be read in conjunction therewith, an embodiment of the invention is shown and, in the various views, like numerals are employed to indicate like parts.

Figure 1:
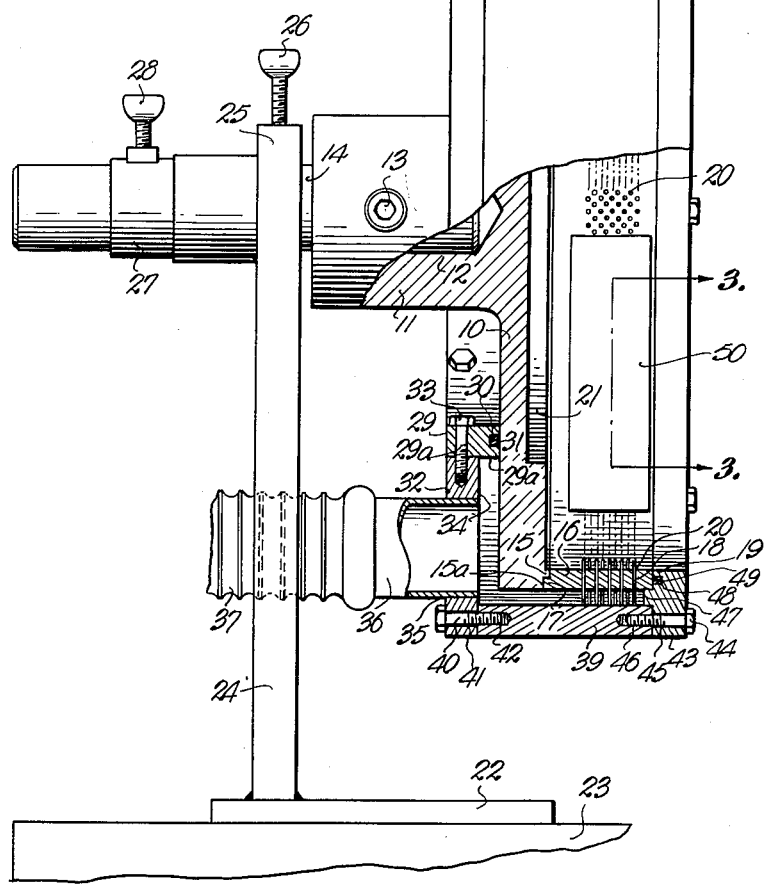
FIG. 1 is a side view with parts cut away and in section showing a typical mold in the process of core insertion with the inventive mold core loading device applied thereto.
Figure 3:
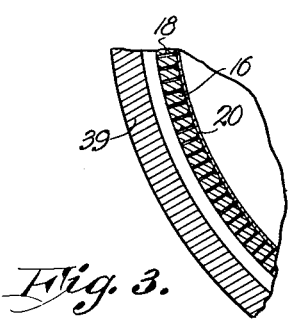
FIG. 3 is a view taken along the line 3—3 of FIG. 1 in the direction of the arrows.

In my application Serial No. 721,491, supra, I disclosed in FIGS. 1, 2, 9 and 10, molds adapted to be loaded by the instant invention. A typical, but not limiting, mold construction is shown in FIG. 1 of my instant application, in the process of loading cores thereinto. Base plate 10 may be formed of cast iron or like material and has base 11 centrally of the underside thereof with socket 12 formed centrally thereof. Set screw 13 is threaded into an opening to grip base 11 upon shaft 14 of the mounting and rotating device to be described. Base plate 10 is circular in plan view and has circumferential ring 15 formed thereon producing circumferential peripheral groove 15a thereby. Mold flange or ring 16 having depending lip 17 to fit into groove 15a mounts at right angles to base plate 10. A plurality of fine diameter openings are positioned extending through the ring 16 spaced above the base plate 10 and below the top 19 of the ring 16 as shown at 18. Each opening 18 is preferably counterbored as shown at 20 on the interior of the ring 16.

A recess 21 is provided for a pouring plate of specialized material, if desired. Ring 16 mounts at right angles to the base plate 10. The outer diameter of the ring is preferably substantially that of base plate 10. Openings 18 are preferably at right angles to ring 16 and parallel with the face of base plate 10.

Turning to the means for mounting the mold in preparation for loading, platform 22 rests on mounting surface 23. Upwardly-extending post 24 has an opening (not shown) which receives the shaft 14 in ring 25, the latter fixed to post 24. Set screw 26 fixes or releases shaft 14 for rotation within post 24 and ring 25. Collar 27 having set screw 28 thereon is fixed to the outer end of shaft 14 and regulates the extension thereof past post 24.

Turning to the description of the inventive vacuum loading device, hollow ring 29 is of greater internal diameter than that of collar 11 and fits therearound. An O-ring recess 30 receives circumferential O-ring 31 in one edge of the ring 29. Circular plate 32 is fixed by spaced bolts 33 to the outer face of ring 29, bolts 33 passing through openings 29a in ring 29 and received in threaded openings 34 in disc or plate 32. Enlarged opening 35 is formed through the plate 32 and receives vacuum connection 36 therein to which flexible vacuum line or pipe 37 is attached. The outer diameter of plate 32, when fixed to ring 29 and ring 29 is positioned as in FIG. 1, is greater than the outer diameter of ring 16 by the distance it is desired that the mold cores 38 extend outwardly past the outer face of ring 16. Flange ring 39 is circumferentially fixed to the outer edge of plate 32 by spaced bolts 40 which pass through openings 41 and into internally threaded openings 42 in flange rings 39. Outer sealing plug ring 43 is fixed circumferentially to the outer edge of flange ring 39 by spaced bolts 44 received in openings 45 in plug ring 43 and internally threaded openings 46 in flange ring 39. Secondary flange 47 fits between the flange ring 39 and the mold ring 16 and spaces the two members apart the desired distance. An O-ring recess 48 receiving O-ring 49 circumferentially is formed outwardly of the outer edge of mold ring 16 to provide a sealing vacuum fit thereat.

With O-rings 31 and 49 sealing against the underside of the plate 10 and the top edge of ring 16, a sealed circumferential annulus is provided between ring 29 and plug ring 43 in which a vacuum may be pulled. The plurality of openings 18, then, have air drawn therethrough, except when prevented by a sealing patch such as strip 50 of tape which may be applied to increase the suction at each opening. As the leads or cores 20a fill the respective openings, the patch 50 may be withdrawn as the cores substantially plug any air flow through the individual holes.

Figure 2:
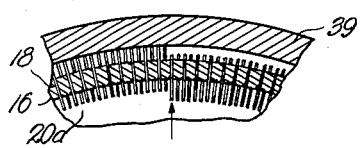
FIG. 2 is a view taken along the line 2—2 of FIG. 1 in the direction of the arrows.

By merely holding the cores in a substantially parallel position to the openings in which they are to be fed, the operator can pass a number of cores over the openings, and one core will be sucked into each opening. The mold should be positioned on the shaft 14 in a fixed horizontal position so that a certain portion of holes 18 are vertically oriented. As the mold is filled in one section, set screw 26 is released and the mold rotated a limited amount to receive the next charge. When the tape masked portion is reached, the tape is merely pulled off. The vacuum holds the cores in place, even when the originally loaded cores pass upwardly to the upper position of FIG. 1. Loss of vacuum in this system, however, may cause the upper cores to fall out, which must be guarded against. In FIG. 2, the inspection having been completed, the mold cores 20a are pushed in, from the outside row by row, by the operator. This is possible, of course, only after the entire loading device is removed from the mold. The mold must also be turned to the vertical position before this is done. Otherwise, the top mold cores would fall out. This is accomplished by providing a pivotal mounting as shown in FIG. 1.

When the vacuum being pulled has been turned off, the pour plate may be fitted into recess 21, the top of the mold fitted over the ring 16 to seal the cores therein, and the molding process carried out as set forth in my application Serial No. 721,491, supra.

From the foregoing it will be seen that this invention is one well adapted to attain all of the ends and objects hereinabove set forth together with other advantages which are inherent to the methods and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter hereinabove set forth or shown in the accompanying drawings is to be interpreted as illustrative and not in a limiting sense.

Having thus described my invention, I claim:

1. A mold core loading device for use in connection with a casting mold having a substantially circular base plate mounting a peripheral circumferential flange, said flange connected to and extending substantially normal to said base plate and defining a mold cavity therewith, and having a plurality of small diameter holes extending therethrough, comprising means circumferentially enclosing the outer side of said mold flange and circumferentially spaced therefrom to provide a substantially uniform annulus therebetween, said annulus of a width equal to the distance it is desired that the cores extend past the mold flange, said means enclosing the exit openings of all of said small diameter holes extending therethrough and a vacuum connection to said enclosing means whereby to draw air through said holes into said enclosing means and out through said vacuum connection.

2. A device as in claim 1 including means for masking a portion of the flange holes before filling thereof with mold cores.

3. A mold core loading device for use in connection with a casting mold having a substantially circular base plate mounting a peripheral circumferential mold flange; said mold flange being connected to and extending substantially normal to said base plate; defining a mold cavity therewithin, and having a plurality of small diameter holes extending therethrough; comprising a seal ring circumferentially overlying in sealing contact the top edge of said mold flange and extending circumferentially thereof; said ring having depending spacing means thereon extending below the top edge of said mold flange; a core abutting flange positioned concentrically to said mold flange and spacing means and fixed to said seal ring; said spacing means positioning the core abutting flange outwardly from the mold flange the distance it is desired that the mold cores extend beyond the mold flange; said core abutting flange extending below said mold flange perforations; means sealing said abutting flange to said base plate below the perforations in said mold flange, and a vacuum connection drawing air from the annulus between the core abutting flange and the mold flange.

4. Apparatus as in claim 3 wherein the core abutting flange extends below said base plate and the means to seal the core abutting flange to the base plate includes a ring extending inwardly relative to the base plate and sealed to the underside thereof.

5. Apparatus as in claim 4 wherein the vacuum connection is positioned below said base plate.

References Cited in the file of this patent

UNITED STATES PATENTS

| | | |
|---|---|---|
| 1,038,682 | Thompson | Sept. 17, 1912 |
| 1,501,338 | Henry | July 15, 1924 |
| 2,042,015 | Moormann | May 26, 1936 |
| 2,125,332 | Bursell | Aug. 2, 1938 |
| 2,174,904 | Taylor | Oct. 3, 1939 |
| 2,340,785 | Wilson | Feb. 1, 1944 |